United States Patent [19]
Halsall et al.

[11] 3,731,279
[45] May 1, 1973

[54] CONTROL SYSTEMS

[76] Inventors: James Richard Halsall, 17, Whiteknights Road, Reading; Alan Percy Cooper Murrell, Old River Cottage, Guildford, both of England

[22] Filed: July 29, 1971

[21] Appl. No.: 167,413

Related U.S. Application Data

[63] Continuation-in-part of Ser. No. 787,737, Dec. 30, 1968, abandoned.

[52] U.S. Cl. .......................... 340/172.5, 340/347 AD
[51] Int. Cl. ................................................ G06f 3/00
[58] Field of Search ...................... 235/154, 150.53; 340/347 AD, 172.5, 163, 151; 318/562

[56] References Cited

UNITED STATES PATENTS

| 3,267,434 | 8/1966 | Clark et al. | 340/172.5 |
| 3,541,513 | 11/1970 | Paterson | 340/172.5 X |
| 3,465,298 | 9/1969 | La Duke et al. | 318/562 X |
| 2,986,726 | 5/1961 | Jones | 340/347 AD |

*Primary Examiner*—Charles D. Miller
*Attorney*—Cushman, Darby & Cushman

[57] ABSTRACT

A control system in accordance with this invention provides a Digital computer supervised electric control system for monitoring and controlling a plurality of separate variables each variable having an associated and individual measuring device and each measuring device having an associated and individual encoder.

9 Claims, 12 Drawing Figures

CONTROL SYSTEMS

This application is a continuation in part of application Ser. No. 787,737 filed Dec. 30, 1968 (now abandoned).

This invention relates to control systems using digital computers and/or digital process controllers.

In certain known systems of digital supervisory control, use is made of individual analogue process controllers with a digital computer setting the desired controller values and, in some cases, control parameters, to conform to the optimum values derived from calculations involving relevant process measurements.

In known systems of Direct Digital Control a digital computer is programmed to carry out all the functions of the individual analogue process controllers in addition to calculating the optimizing data.

These known systems are based on the realization that the control of, for example, a complex chemical plant involves the rapid calculation of a considerable amount of process data at frequent intervals and that, digital computers having the characteristic property of high computational speed and specifiable accuracy are particularly suitable for this purpose.

Direct Digital Control systems can generate the control functions by digital means with greater precision than the analogue controllers used in supervisory systems. There is also a cost saving in so far that each variable does not require an individual analogue controller. On the other hand, supervisory systems are far less vulnerable to the effects of computer failure since control can be maintained by means of the individual controllers in this event.

The computers used in Direct Digital Control systems require a much wider frequency bandwidth than is necessary in supervisory systems, since the control functions for each individual loop must be generated by the Direct Digital Control computer.

The earliest applications of computer control to process plant, therefore, used analogue controllers to produce the necessary wide bandwidth for the control of the individual process variables, supervised by means of a co-ordinating digital computer of limited bandwidth. This concept is described in U.S. Pat. No. 2,932,471.

With the advent of wide bandwidth digital computers Direct Digital Control systems have been successfully operated in a number of applications which, hitherto, would have been performed by supervisory systems. However, supervisory systems are still preferred in applications to complex plant in those cases where interruption of production due to computer failures would have serious economic consequences.

Whichever form of computer control is adopted the problems of feeding analogue process measurements to the digital computer and operating analogue control devices from the digital computer remain.

Special purpose equipment must be used for sampling the multiple input signals and for analogue to digital and digital to analogue conversion. Frequently a given process measurement is required both in digital form by the computer and in analogue form by an individual supervised or standby analogue controller. The cost and complexity of this specialized plant interface equipment is usually several times greater than the cost and complexity of the computer. Moreover, the interface equipment usually includes a common signal multiplexer and analogue to digital converter the failure of which would be as serious as a failure of the computer.

In general it is not possible to couple a digital computer to an existing plant equipped with conventional analogue control equipment without considerable modification to the existing instrumentation, in addition to the use of the special computer interface equipment. On the other hand, if existing plants were to be equipped with digital instrumentation for the measurement and control of the individual process variables, the problem of coupling to a digital computer would be greatly eased. Moreover, an individual digital process controller used in a supervisory control system could be made to give the same degree of precision as the control functions generated in a Direct Digital Control system.

Few primary measuring elements for process variables will produce a digital output directly and the majority of measurements would require individual analogue to digital converters. The outputs of these individual analogue to digital converters could be arranged in a form suitable for feeding into either individual digital controllers or a digital computer.

The provision of digital instrumentation for the measurement and control of individual process variables would afford the necessary compatibility between plants and digital computers and/or digital process controllers to permit the introduction, as required, of digital supervisory control. Direct Digital Control, digital standby control, and the evolution of complex digital hierarchical systems.

A control system in accordance with this invention provides a digital computer supervised electric control system for monitoring and controlling a plurality of separate variables, each variable having an associated and individual measuring device and each measuring device having an associated and individual encoder. The control system of the invention provides the features of random access to all the encoders and obtaining from an encoder so assessed (and at any time) an immediately correct response to the interrogation signal regardless of whether the input to the device so interrogated is steady or in the process of changing. In other words, the system of the present invention is free of transition error.

Transition error is sometimes referred to as "ambiguity error" and in the British Standard Glossary of terms used in Automatic Data Processing — (BS 3527:1962) — "ambiguity error" is defined as "a transient gross error which may occur in reading the digital representation of a number when it is changing due to lack of precise synchronism of the changes in different digital positions (for example, in a multi-digit digitizer). Thus, in passing from 199 to 200, 299 or 209 might be indicated."

There are two main reasons why the system of the present invention provides the immediately correct response to the interrogater regardless of input signal variations. The first reason is that each encoder provides continuously encoded output signals in progressive code — otherwise known as unit distance code. The simplest progressive code is the Gray code and, in this specification particular reference is made to the use of Gray code in the description of the encoders. The second reason, which will become more apparent from the description of the drawings, is that the output of each encoder is taken from the flip flops of a progressive code counter which forms a component of each encoder.

A number of control systems have previously been proposed and in U.S. Pat. No. 3,399,299 (Nichols) there is described a data acquisition system in which two analogue to digital converters are used to sample signals received from low pass filters at discrete intervals of time and does not provide continuously encoded output signals. Moreover, Nichols does not interrogate on demand.

Various analogue to digital converters have also be suggested including those described in U.S. Pat. Nos. 3,127,601 (Kaenel); 3,112,478 (Ostroff); 2,730,676 (Barker) and 3,329,950 (Shafer).

Kaenel employs a binary counter and binary to Gray code converter as an advantageous means for minimizing inaccuracies in the abstraction of digital output signals from the binary counter. In his specification, Kaenel assumes that his binary to Gray code converter faithfully translates the Binary code into Gray code and it, therefore, follows that it will also faithfully translate all the states of the binary counter into the Gray code, including false transition states. Kaenel's analogue to digital converter is, therefore, not capable of providing an output signal which is free from transition error which is the case using the system of the present invention. On the other hand Ostroff does not employ a progressively coded output and makes no provision for eliminating transition error.

By way of contrast to the analogue to digital converters of Kaenel and Ostroff, the patents to Barker and Shafer describe analogue to digital converters which provide an output in Gray code. However, an indicated above, important features of the present system are that it provides random access to all the encoders and obtains from an encoder so accessed an immediately correct response to the interogation signal. These features are not obtainable using the analogue to digital converters of either Barker or Shafer and are obtained in the system of the present invention by including therein a Gray code or other progressive code counter. Such a progressive code counter enables the system to be controlled so as to ensure that the output only changes in unit distance steps. Considered slightly differently, the use of the Gray code or progressive counter ensures that when changing from one value to another, the output passes through each intermediate unit distance step. Thus, the counter ensures that, when changing, the output cannot omit any intermediate unit distance step and cannot, therefore, produce a change which has non-unit distance transitions.

As far as the inventors of the present invention are aware, the use of a progressive code counter in conjunction with the encoders is entirely novel and the use thereof enables a correct value, free from transition error to be obtained irrespective of the stage when a reading is taken. In the present system, if interrogation takes place before a change in value occurs, the value recorded will be the old value. If however, interrogation takes place after a change in value occurs, the value received will be the new or changed value. There is no intermediate value, nor is there any possibility of an incorrect value being obtained. The value obtained is correct in every case and depends solely upon the time of interrogation or reading.

According to one form of this invention an electric control system comprises:
a. a plurality of measuring devices for measuring separate variables, each measuring device having an associated encoder;
b. each encoder including:
 1. a feedback for maintaining the encoder in continuous balance with respect to the variable measured; and
 2. a counter operable in a progressive binary code which is free from transition error when changing in value, the counter being used for controlling the balancing feedback within the encoder and also for providing an output signal which is free from transition error and which is readable on demand; and
c. a digital computer which can be programmed to selectively address any one encoder and to accept, store, output and arithmetically process the output signal in digitally coded form from the selected encoder so addressed by the computer and to generate at least one control signal.

The invention also includes, in an electric control system which monitors a plurality of separate variables, means for supplying data representative of said variables to a computer, said means comprising:
a. a plurality of encoders each having supplied as an input thereto a signal representative of a separate one of said variables, each encoder including:
 1. means for comparing its respective input with a feedback signal generated by said encoder to develop a comparator output;
 2. means for applying said comparator output as a digital input to a counter which operates in a cyclic pro-gressive code in a manner such that each unit change in count of the counter is characterized by a single digit transition in said counter; and
 3. means for converting the count of said counter to said feedback signal and for applying the feedback signal to the comparing means; and
b. gating means under the control of said computer for selectively connecting the counts of said counters as inputs to the computer.

At least one encoder may be associated with a digital controller which is included in a control loop under supervision of the digital computer, for supervising control of the process in accordance with desired criteria under programme control. The single digital computer may also be used for calculating optimizing data for the control of the process. If desired, each measuring device may include an analogue to digital converter for encoding the measured variables into digital form.

Most process measurement transducers with electrical outputs converta primary measurement into a standard D.C. transmission signal typically of the order of 0–10 mA. f.s.d. to an accuracy of about one-half percent. This current signal can be passed through a fixed resistor to develop a voltage which might conveniently be of the order of 0–1V. To digitize this voltage without introducing a significant error would require an analogue to digital converter with an accuracy of about 1 part in 1,024 giving an output of 10 binary digits (bits).

Various techniques are known such as Kaenel (U.S. Pat. No. 3,127,607) for encoding signals of the order of 0–1V to an accuracy of 10 bits. Techniques using integration, feedback and counting are most commonly used, with either binary or binary coded decimal output.

Many of these techniques such as Nicolls (U.S. Pat. No. 3,399,299) are discontinuous in operation, with finite time delays between sampling the input signal and presenting the digital output. Others which use the continuous feedback principle in conjunction with conventional counting techniques (such as Kaenel) pass through widely scattered transition states during counting which must be prevented from registering a false output, and are therefore also liable to time delays.

By suitable programming techniques a computer can, interrogate such devices, transfer to an alternative task during the time delay and then return to the original calculation when the requested data becomes available. Alternatively, the devices can be interrogated by a particular data handling system with direct access to the computer memory, and stored sequentially at a suitable rate. Both these techniques lead to complexity either in programming or in the provision of hardware.

Conveniently, each encoder is a counter comprising a plurality of bistable elements arranged to produce an output in Gray code. Such a counter is that described and claimed in our U.S. Pat. application Ser. No. 787,722 filed Dec. 30, 1968 (now abandoned).

The bistable elements of the counter are, preferably, connected to logic circuits for converting the Gray code output into a binary code output, means for generating a parity signal from the binary code output to represent the parity of the Gray code output, and means for applying the parity signal to the plurality of bistable elements, a signal comparator to which is fed a first input signal from the binery output of the counter and a second input signal representing a measured variable, and a control unit to which is fed an output signal from the comparator. The system may include a pulse generator for feeding signal pulses to the control unit which serves to feed signal pulses from the control unit to the plurality of bistable elements and to a direction control means. The system may also include a feedback to which the binary coded output from the counter is fed and which produces the first input signal to the signal comparator so that, in operation, signal pulses are fed to the counter and the counter produces an encoded output signal in digital form representing a measured variable.

The input signal representing the measured variable may be analogue voltage signal in which case the signal comparator is a voltage comparator. Alternatively, the signal representing the measured variable may be a frequency signal, and in such a case the signal comparator is a frequency comparator. This aspect of the invention can also be incorporated in an updating unit for discontinuous inputs.

Various embodiments of the invention will now be described, by way of example, with reference to the accompanying diagrammatic drawings, in which:

FIG. 1 illustrates an analogue to digital converter;
FIG. 2 illustrates a frequency to digital converter;
FIG. 3 illustrates an updating unit unit for discontinuous inputs;
FIG. 4 illustrates a digital computer highway system;
FIG. 5 shows a frequency control unit;
FIG. 6 shows a common address and device selector, and
FIG. 7 is an algorithum flow chart.

FIG. 1 shows an analogue to digital converter which utilizes that type of cyclic progressive binary code, known as the Gray code, for counting purposes. Other types of cyclic progressive code could also be used with appropriately designed counters.

Inequality between the analogue voltage V1 and a feedback voltage VF causes pulses to be fed along a pulse line P into a Gray code counter GC. As stated previously, such a counter is disclosed in our U.S. Pat. No. 3,588,461. The voltage VF and V1' are fed to the counter via a voltage comparator VC and a control unit CU which is powered by a pulse generator PG. Comparator VC may be selected from those which are well known in the art. The control unit CU comprises conventional logic circuitry for producing pulse inputs to the counter in response to the comparator output. A direction control signal from a direction control DC is also fed into the counter GC. The direction control DC as disclosed in the aforementioned U.S. Pat. No. 3,588,461 receives input from the control unit CU and a parity signal along parity line PAR which parity signal represents the parity of the Gray code output. The feedback circuit is completed by a digital/analogue converter DAC which receives a reference voltage VR and binary coded output from the Gray to binary converter GBC and produces the feedback voltage VF. The converter GBC is also disclosed in U.S. Pat. No. 3,588,461. Each input pulse will cause only one single digit to change in the encoded output from the counter. A multiple number of input pulses will cause the output from the counter to change progressively from one encoded number to another, without passing through scattered transition states. When equality is established between the analogue input voltage and feedback voltage the counter provides a fixed encoded output corresponding to the input voltage.

The Gray code output available to the computer will in general need to be translated into binary code for computation purposes and this can be accomplished either by routine programming or by equipping the computer with a translation facility.

The continuous feedback principle employed in the analogue to digital converter can also be applied to the measurement of frequency for coupling the computer to measurement transducers of a type which generate frequency proportional signals.

For this purpose the voltage comparator is replaced by a conventional frequency comparator FC together with a means for generating a feedback frequency proportional to the encoded output and for this purpose a known binary rate multiplier may be used.

These techniques can be combined with a new form of counter used in the analogue to digital converter, to encode frequency input signals in the Gray type of cyclic progressive code as illustrated in FIG. 2.

The feedback frequency in FIG. 2 is derived by combining selected output pulses from a binary scaler BS fed from a pulse generator of fixed frequency FR and from a frequency selection gating unit F.G.U. The scaler and the frequency selection gating unit are disclosed in U.S. Pat. No. 3,609,756.

The binary scaler BS and the frequency selection gating unit FGU are essential components of any conventional binary multiplier. Any binary rate multiplier may therefore be used to fulfil the functions of the binary scaler and the frequency selection gating unit such as those described in the "Handbook of Automation Computation and Control," Volume 2, Computers and Data Processing, Edited by Grabbe, Ramo and Wooldridge, published by John Wiley & Sons Inc., New York (1959). However, a particularly useful binary rate multiplier for use in the control system according to the present invention is that described and claimed in my U.S. Pat. No. 3,609,756 filed May 19, 1969.

The binary scaler BS has a plurality of cascaded binary division stages and each stage yields one output pulse for every two input pulses. Thus, the first stage of the binary scaler divides the reference frequency FR by a factor of two and each successive stage of the binary scaler divides the reference frequency FR by a factor of two and each successive stage of the binary scaler divides the reference frequency FR by a further factor of two so that, as indicated in FIG. 2, the pulse on the extreme right-hand side is FR/2 and the output on the extreme left hand side is $FR/2^n$, intermediate output frequencies being in binary progression, e.g., FR/4, FR/8 etc. This series of output pulse rates from the binary scaler BS forms one of two sets of inputs fed into a frequency selection gating unit FGU. The other set of inputs is the binary coded output received from the Gray/binary converter which forms one component of the reversible Gray/binary counter. The said binary coded output of the Gray/binary converter corresponds to the Gray coded output of the reversible Gray/binary counter. Each binary coded signal from the Gray/binary converter when in the binary "1" state and as applied to the frequency selection gating unit FGU selects the corresponding binary valued or weighted pulse rate fed to the FGU from the binary scaler. When any binary coded signal from the Gray/binary converter is in the binary "0" state it will not select the corresponding pulse rate from the binary scalor. As a result, all selected frequencies are fed into the common feedback line to form the feedback frequency FF. The feedback frequency FF therefore represents the product of the reference frequency multiplied by the fractional binary value corresponding to the state of the reversible Gray/binary counter.

The selection of the pulses is determined by the state of the Gray code counter. The contents of the Gray code counter are adjusted until the input and feedback frequencies are equal. In FIG. 2, the input frequency is shown as FI and the feedback frequency is shown as FF. Other references on FIG. 2 are the same as for FIG. 1.

The output of the Gray code counter will be either fixed or changing in a progressive manner and can be interrogated at any time on demand.

The principle of using Gray code to provide inputs which can be interrogated by the computer on demand without risk of transition errors, can be readily extended to all forms of discontinuous inputs such as may be derived from measuring systems operating cyclically or from manual input devices.

The requirement is for some form of updating unit based on the progressive action of the Gray code counter.

FIG. 3 shows one form of updating unit for transferring binary data (in the form of an updating control signal along line UDS) from a discontinuous source to the Gray code counter by the use of a binary comparator BC.

The binary comparator BC has a control enter/hold input CI which must be energized to enable the transfer of the data to take place. This control input enables the comparator to operate and to adjust the contents of the Gray code counter to correspond to the input data. At all other times when the control input is not energized the comparator BC is clamped to ignore the input data and the counter retains the number stored during the last valid transfer.

The devices described with reference to FIGS. 1 to 3 can be used as input devices 1D to convert the various measured variables M into Gray coded parallel digital signals. These devices can be connected in parallel through conventional switching logic gates DS to a common address CA and data highways DH (input and output) of a computer. Common address CA comprises well known addressing circuitry. The switching logic gates DS selectively connect the output of the appropriate input devices 1D or the input to known digital controller output devices CD to the data highway on receipt of an address on the address highway as shown in FIG. 4.

The common address highway AH may have a three digit binary coded address and may be represented as follows:

| addressed device | c | b | a |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

The common address CA receives binary coded input signals along the address highway AH (a b c) and decodes these signals for any particular decoded value on the address highway so that a single and correspondingline from the common address unit is energized. Thus any particular binary combination applied to AH will cause one unique device selector DS to be addressed. Each device selector DS also receives an input in Gray coded form from its associated input device ID and on receipt of this decoded address signal the Gray coded output is fed into the computer via input data highway DH. The common address CA can also address output selectors DS so as to permit output data from the computer to be fed output devices OD via corresponding output data selectors DS.

A known circuit diagram of the common address decoder CA and a device selector DS are shown in FIG. 6. In FIG. 6, the common address CA is depicted as receiving a three-bit binary coded signal from the address highway AH (c b a). The circuit includes inverting gates 600, 601 and 602 for generating, in addition to $a$, $b$, $c$, the inverses $\bar{a}$, $\bar{b}$, $\bar{c}$ of the input binary digits and for each output in this case there is a three-input AND gate 600A, 601A, 602A in each of the output lines 600B, 601B, 602B.

The first input for each of the three input AND gates is connected as appropriate to incoming signals to $a$ or $\bar{a}$. The second input is connected to $b$ or $\bar{b}$ and the third input is connected to $c$ or $\bar{c}$. These three inputs are received from appropriate combinations of the binary digits from appropriate combinations of the binary digits present on the three lines $a,b$, or $c$ and their inverses. The signals on the output lines 600B, 601B, 602B are fed into the appropriate device selectors DS so that Gray coded data from the corresponding ID is gated or allowed to pass into the data highway input DH. The data fed into the data highway input is then read by the computer. Each data line from the input device ID to the data highway consists of an AND gate in series with a diode or OR gate and all the AND gates within a particular device selector DS are enabled by the decoded address passed to that particular device selector from the common address decoder CA.

A more detailed and known circuit diagram showing the frequency control FC in circuit with the control unit CU is shown in FIG. 5. The circuit receives two inputs, namely FF and F1 which are fed to a bistable element 100. Pulses F1 enable the flip-flop 100 to be set (S) and pulses FF enable the flip-flop 100 to be reset. When 100 is set Q would be 1 and $\bar{Q}$ would be 0 and vice versa. If a "set" pulse is received, then Q = 1 and, providing the bistable 100 is not reset, a second pulse applied on line F1 will be passed on via AND gate 101 to a second bistable 102 to "set" 102, whereupon a third F1 pulse will pass through the bistable 102 provided no reset pulse has been received by either of the flip-flops 100/102 thereby allowing a pulse to pass into the counter GC.

If alternate pulses arrive on F1 and FF alternate setting and resetting is obtained and no pulses are passed to the counter GC. Thus, when the pulse frequencies F1/FF are equal, the state of the counter is undisturbed. The converse is also true when pulses are received on FF and not on F1.

In the condition when pulses from FF appear at the input to the counter both bistable elements must be in the reset condition and these conditions are detected by AND gate 103 to produce a reversing spiral for the direction control input to the counter. In other words, when the input of F1 is greater than FF, the counter will receive pulses together with a forward control signal (i.e., 0) whereas if FF is greater than F1 the counter receives pulses together with a reverse signal (1) to DC. Further, when F1 = FF no pulses appear and the counter is inoperative.

The system described allows any input device (ID) (for external data) or any output device (OD) (for external control) to be connected to the appropriate input or output data highway DH by operating the appropriate device selector DS.

The computer can therefore interrogate any of these devices on demand by generating the appropriate address transmitted along address highway AH in the same way that internal computer store locations are addressed and interrogated.

This method of coupling the computer to the plant by means of non-synchronous data input devices, overcomes the inherent synchronization problems of conventional techniques and provides a flexible installation technique, and simplifies both the hardware and programming requirements.

The system of the present invention may be used under the control of any well known computer or digital data processing apparatus, and by way of example, there is now described an algorithm which could be implemented by any stored program digital computer. The algorithm is shown as a flow chart in FIG. 7.

The sequence of operation is initiated in known manner by a timing unit (steps 9 and 10). On receipt of a positive signal from 10 the modifier 1 is set to zero and the address of the first measured value is collected from "memory location A" and is used to interrogate the appropriate measured value 3. This measured value is then substracted from its corresponding desired value stored in "memory location B" and multiplied by the appropriate constant stored in "memory location C." This is then tested, and if the result is not zero (stage 4) we then collect address for the corresponding output from "memory location D" and output the thus-collected value of the corresponding address stage 6. Following stages 5 and 6 (or immediately following step 4 if the result is zero) the program moves to step 7 where the modifier is increased by 1. Step 8 is a test stage to establish if all measured values have been read, and if some measured values have not been read, the cycle of operations 2, 3, 4, 5, 6, 7 and 8 is repeated. The addresses A, B, C and D are increased by "1" each time the cycle 2–8 is repeated.

This recycling behavior is terminated at step 8 when all measured values have been read. The program then remains inactive until a further timing signal is generated by steps 9 and 10.

Briefly, the counter of U.S. Pat. No. 3,588,461 is capable of counting pulses in Gray code up to a maximum capacity of $2^n$ and comprises:

a. $n$ stages of flip-flops of a type which delays a change in the output state thereof until the initiating input to the flip-flop has terminated;

b. a single input line for receiving pulses to be counted;

c. a multiple input enabling means associated with each flip-flop stage, each enabling means having a first one of its inputs connected to said input line;

d. output lines from said flip-flop stages for carrying as the counter output a Gray coded equivalent of the total number of pulses received on said input line;

e. $n-1$ logic circuits connected to said flip-flop output lines for generating as a single output from said circuits a parity signal which is a function of the Gray code output of said counter;

f. an additional logic circuit to which is supplied as inputs the parity signal and a direction control signal, said additional circuit having an output which is applied to a second one of the inputs of the multiple input enabling means associated with the first of said $n$ flip-flop stages to thereby control the change of state of said first flip-flop stage as a function of the input, parity and direction control signals; and g. means for connecting second ones of the inputs of the remaining flip-flop stages directly to output lines of the flip-flop stages next preceding and through further logic circuits to output lines of any remaining preceding stages of flip-flops as well as the input, parity and direction control signals.

In more detail and as described in the specification of U.S. Pat. No. 3,588,461, the said counter will now be described with reference to FIGS. 8 – 12, in which the same reference numerals are used as in U.S. Pat. No. 3,588,461. In the drawings, FIG. 8 illustrates the logical diagram of a seven-stage version of the counter;

Figure 8:
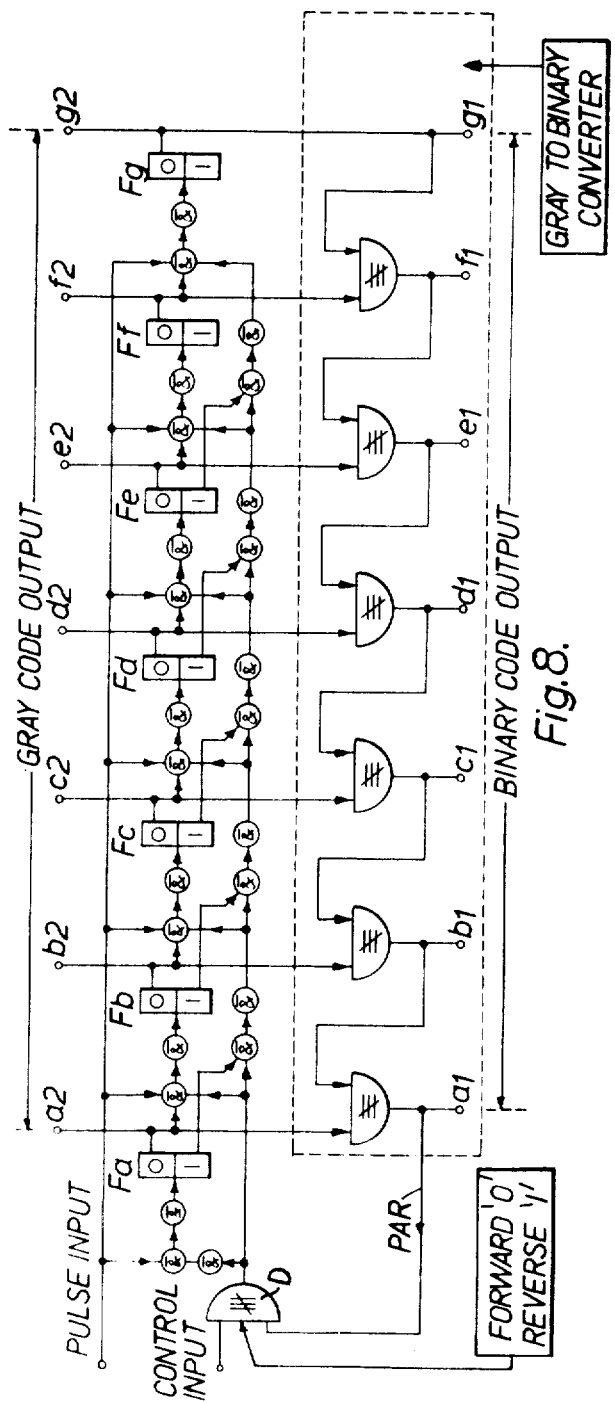

In FIG. 8, seven bistable elements or flip-flops $F_a$ to $F_g$ are coupled through multiple NOT - AND or NAND gates $\overline{\&}$. Each NAND gate $\overline{\&}$ produces a logical output of "0" when all its inputs are "1", and a logical output of "1" under any other set of input conditions. Each bistable element $F_a$ to $F_g$ and its associated NAND gate $\overline{\&}$ forms a stage of the counter and each stage, except the first and last, is identical so that the counter can be extended to afford any desired number of stages.

Figure 9:
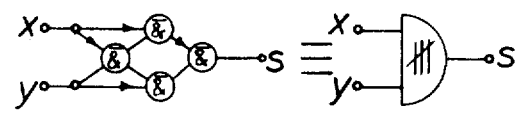
FIG. 9 illustrates one embodiment of an Exclusive-Or circuit using NAND gates suitable for use as a Non-equivalence element in the Gray to binary code conversion schematically shown in FIG. 8.
Figure 10:
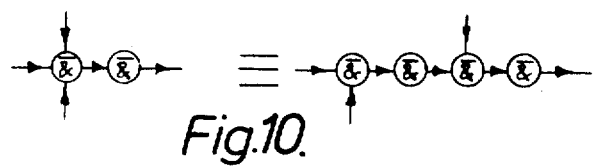
FIG. 10 illustrates a logic circuit which is alternative to the input circuit of flip-flops Fb tp Fg shown in FIG. 8.

The bistable elements $F_a$ to $F_g$ produce outputs at the respective terminals $a_2$ to $g_2$ in a progressive binary or Gray code. The output in Gray code is converted into a binary output at terminals $a_1$ to $g_1$ by means of respective Non-equivalence or Exclusive - OR logical elements $\neq$. The output $a_1$ is the least significant and the output $g_1$ os the most significant digit. Each Non-equivalence element $\neq$ has arrowed input terminals corresponding to $x$ and $y$ (FIG. 9) and an output terminal corresponding to $s$ (FIG. 9) connected to the appropriate binary output terminal $a_1$ to $g_1$ (see FIG. 9). FIG. 9 shows on the left hand side thereof a logic circuit built up from four NAND gates which may serve as Non-equivalence elements. Two forms of logic circuit as shown in FIG. 10 may be assembled from a plurality of NAND gates $\overline{\&}$ to serve as input circuits of $F_b$ to $F_g$ of FIG. 8.

From the least significant digit of the binary code output, a parity signal for the Gray code output is obtained (as hereinbefore described) and is fed to one input terminal of a further Non-equivalence element $\neq$ D. The output of the terminals $a_1$ to $f_1$ constitute all the digits of the dual binary coded output except for the most significant $g_1$. A logic control signal having the "1" or "0" state (in the "1" state the control signal complements the parity signal whereas in the "0" state, the parity signal is uncomplemented or unaffected,) is fed to the other input terminal of this further Non-equivalence element $\neq$, D and the output of this further element $\neq$ D is fed to the flip-flop elements $F_a$ to $F_g$. The output of the further element $\neq$ D may be reversed by means of the control signal fed thereto, which controls the direction of counting by the counter.

The first stage, including the bistable element $F_a$, is controlled by the parity state and the pulse input only. Higher stages, including the bistable elements of $F_b$ to $F_g$ respectively, are each controlled by the parity state, the pulse input, and the state of all the preceding stages.

Additive pulses beyond the maximum capacity of the counter or subtractive pulses below zero are inhibited by the parity control of the gating circuits to prevent overflow in either direction. The conditions are changing the state of a flip-flop have been described previously and, once the counter is "full," no condition can exist whereby an additional pulse could possibly increase the count and vice versa. This feature is inherent in circuitry and the principle of control of the states of the flip-flops of the counter. The counter of the present invention can be modified to permit "overflow" and, when this facility is required, a further flip-flop is added.

The bistable elements $F_a$ to $F_g$ are of the master-slave or J.K. type which delay the change in their output state until the initiating input has terminated, thereby preventing any input pulse from causing more than one change in state of the counter.

Figure 1:
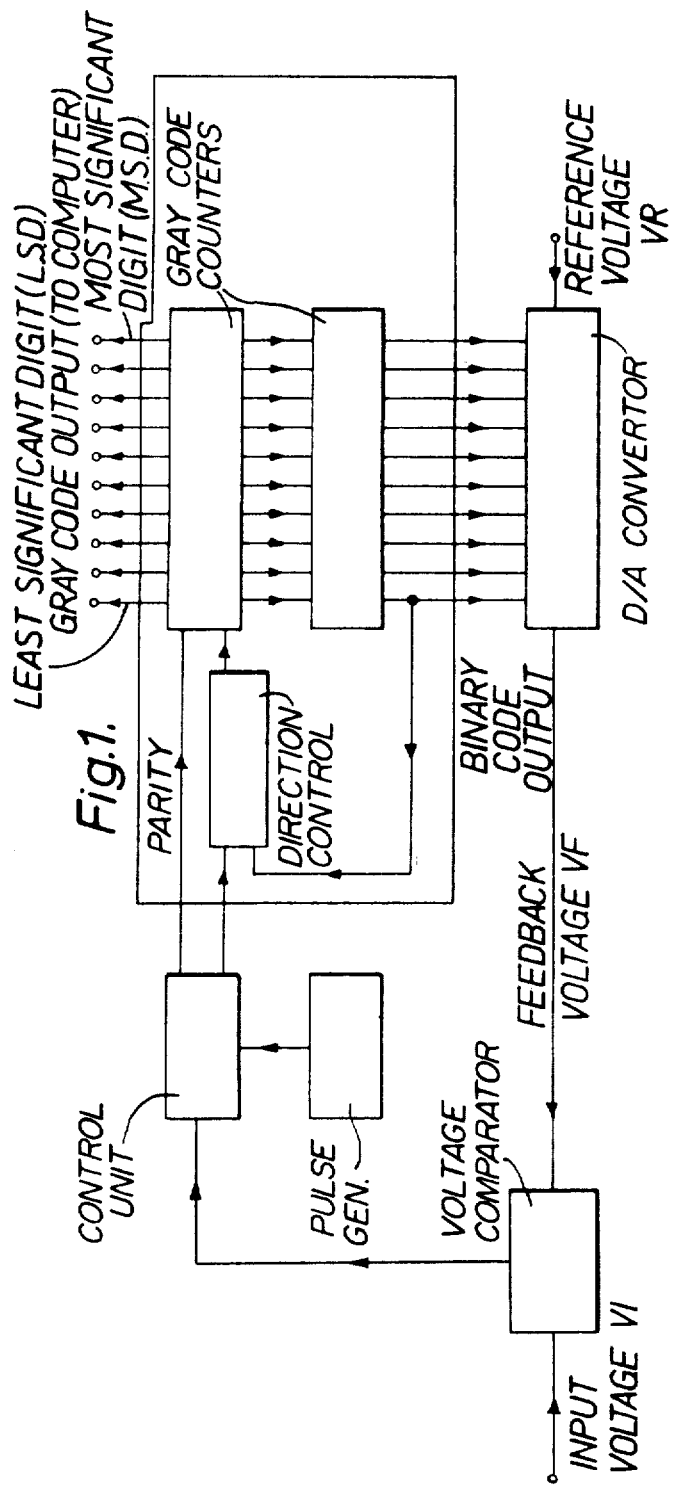
Figure 2:
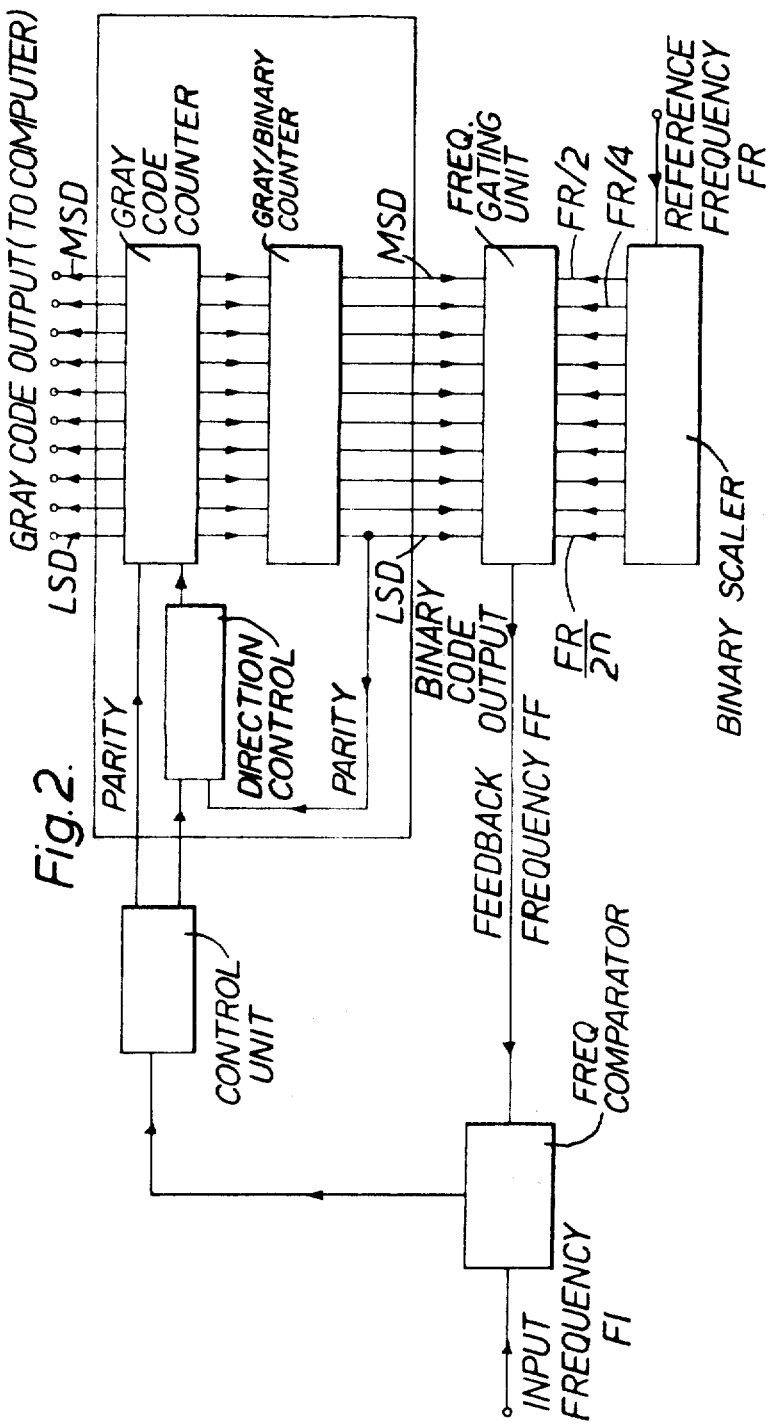
Figure 3:
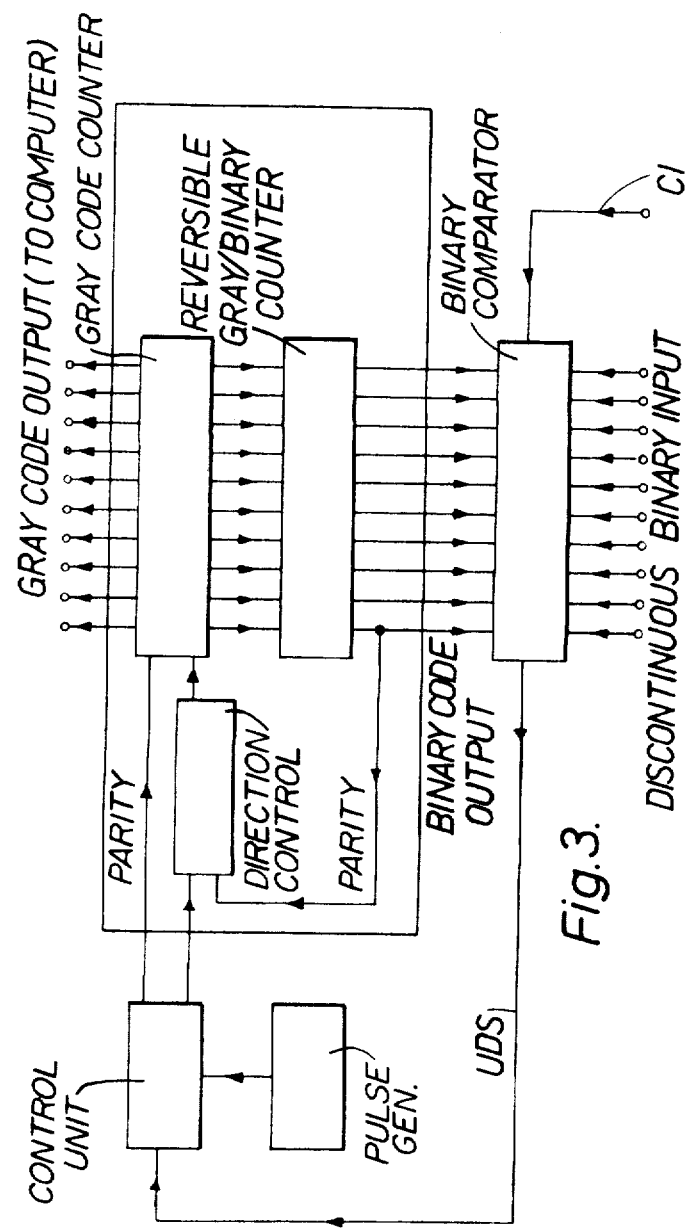
Figure 4:
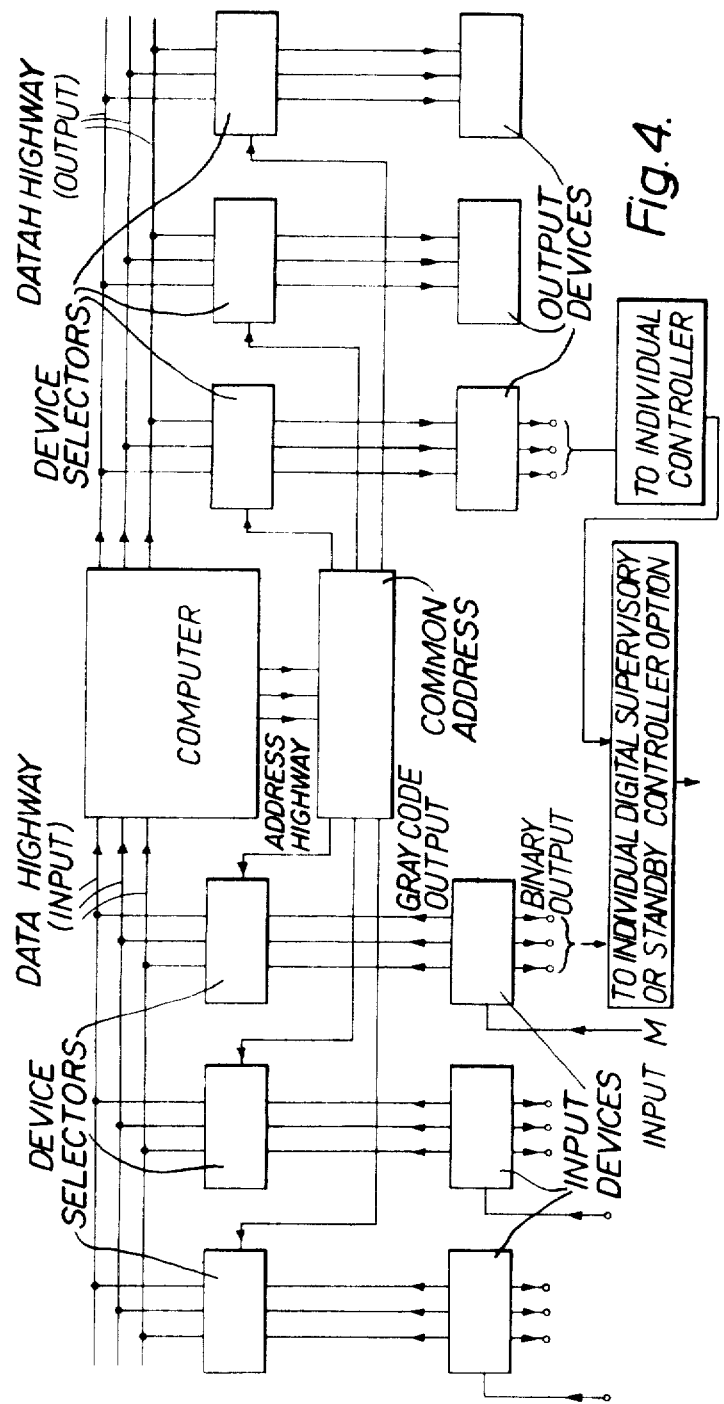
Figure 5:
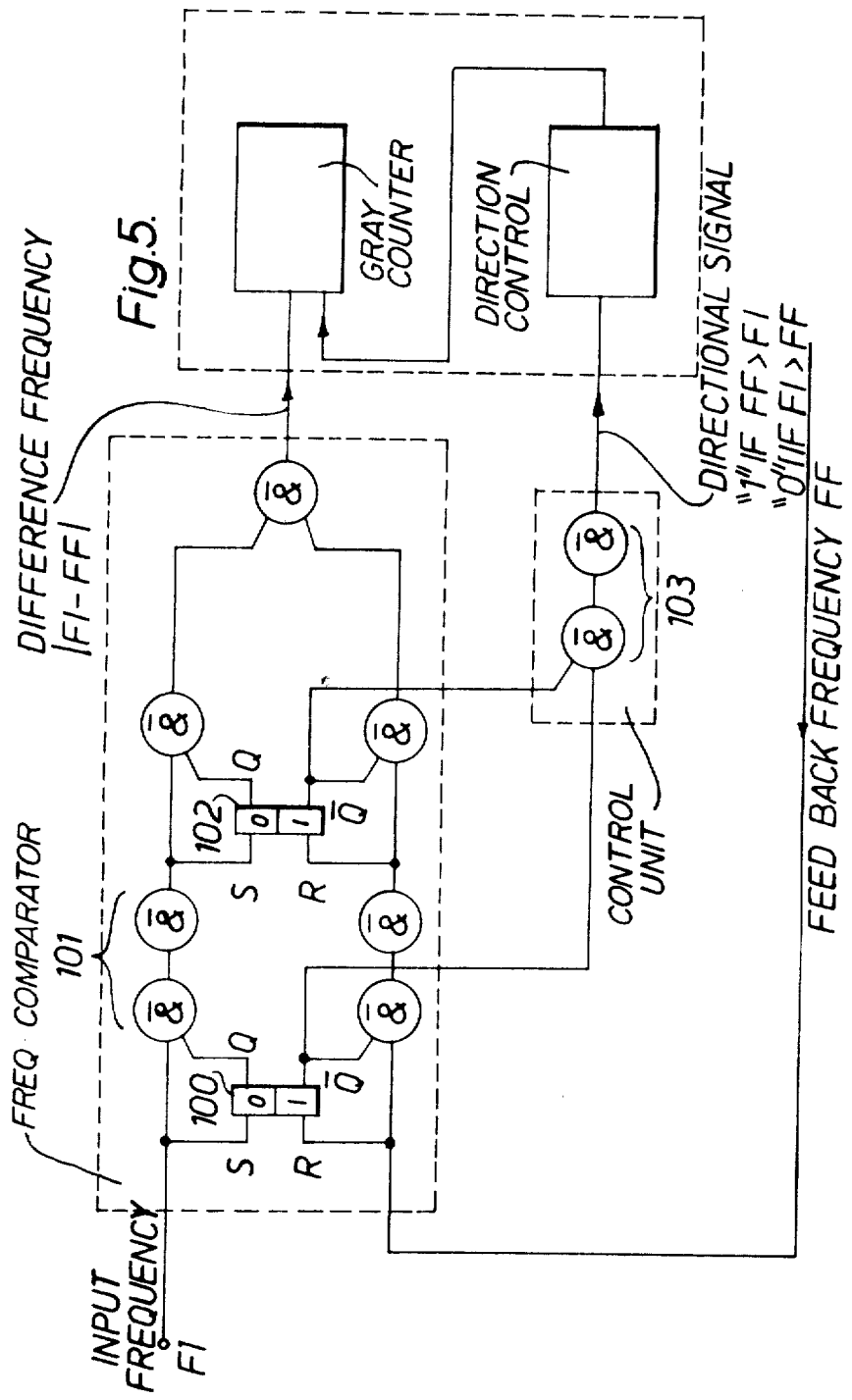
Figure 6:
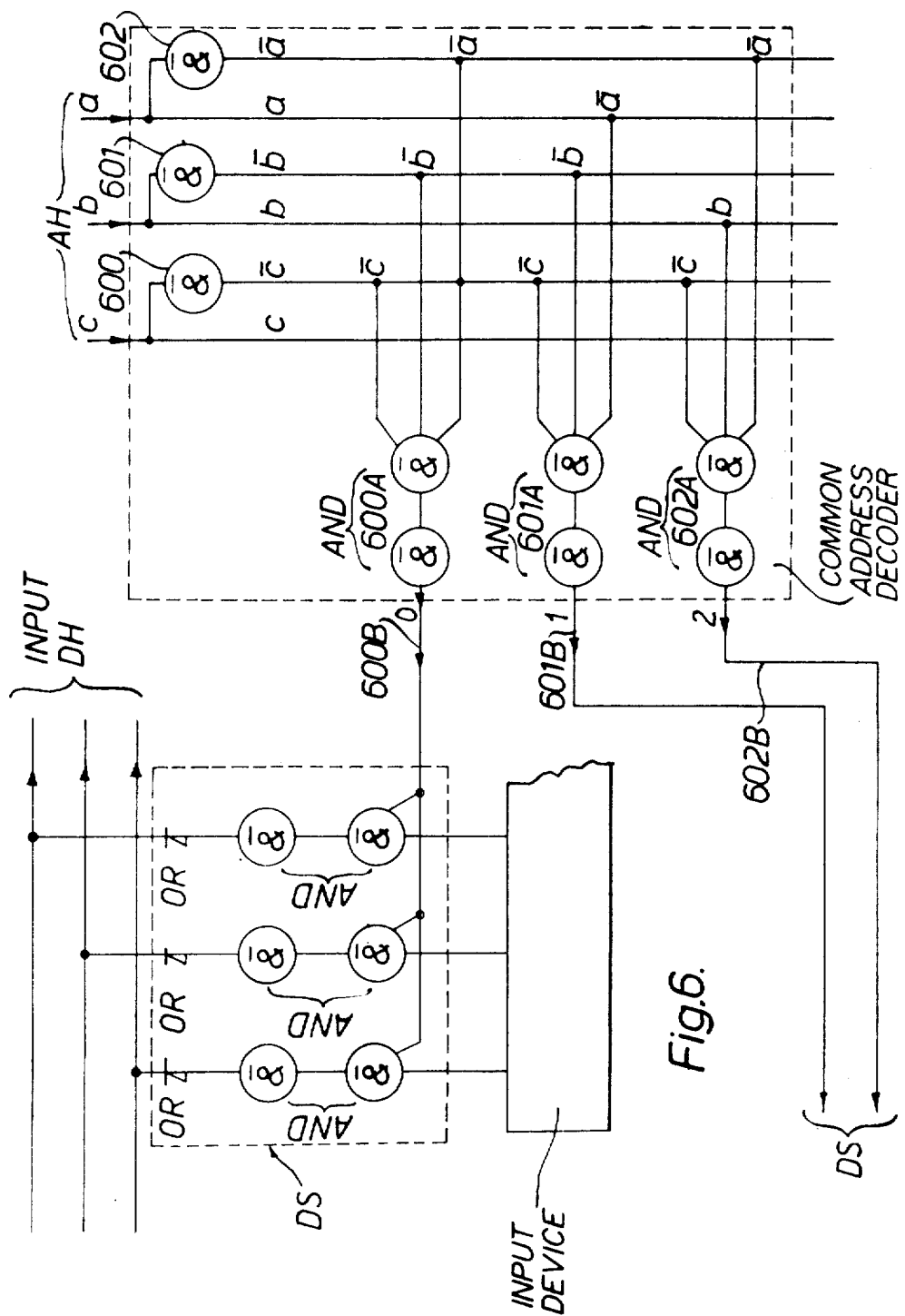
Figure 7:
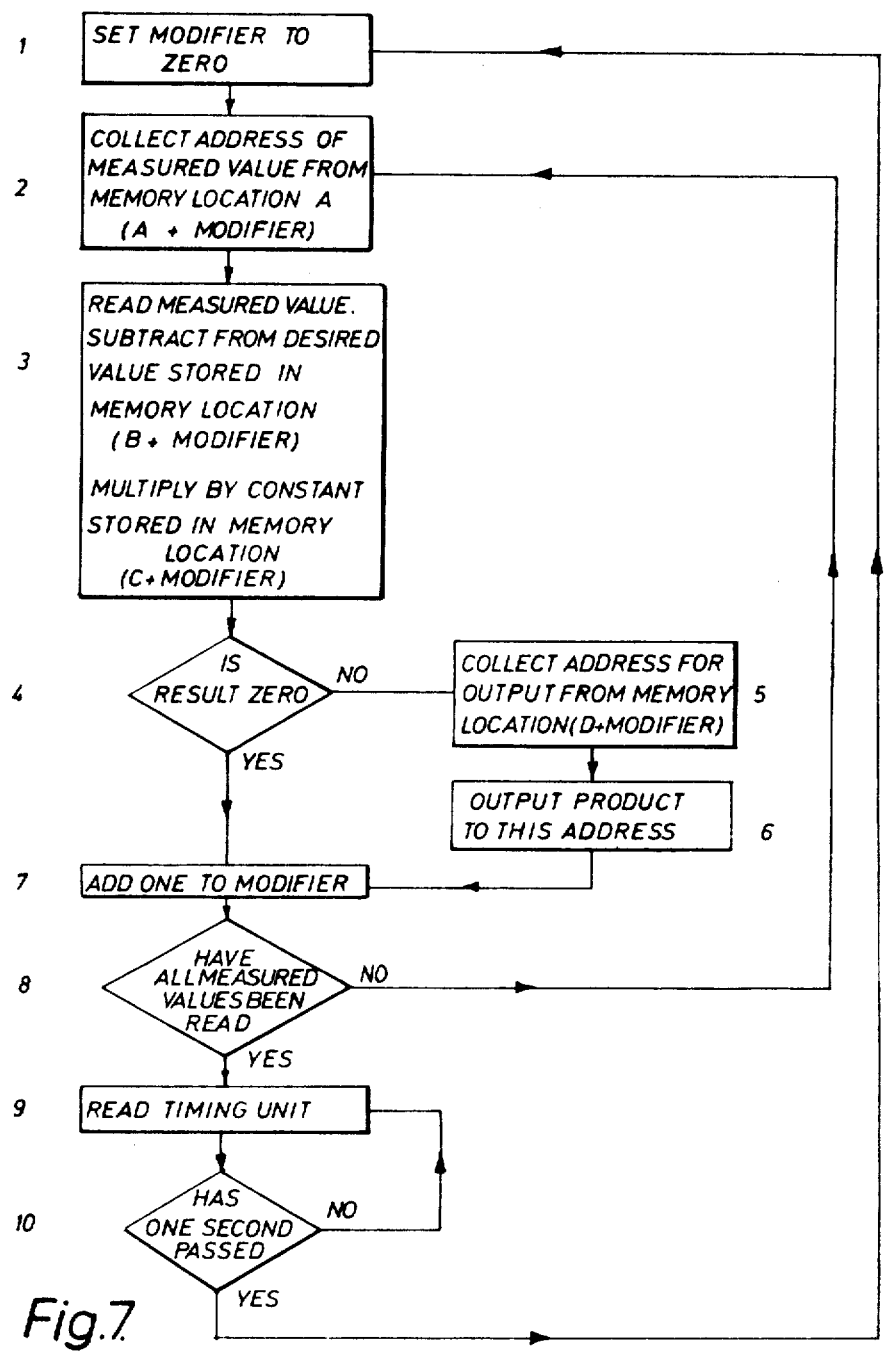
Figure 11:
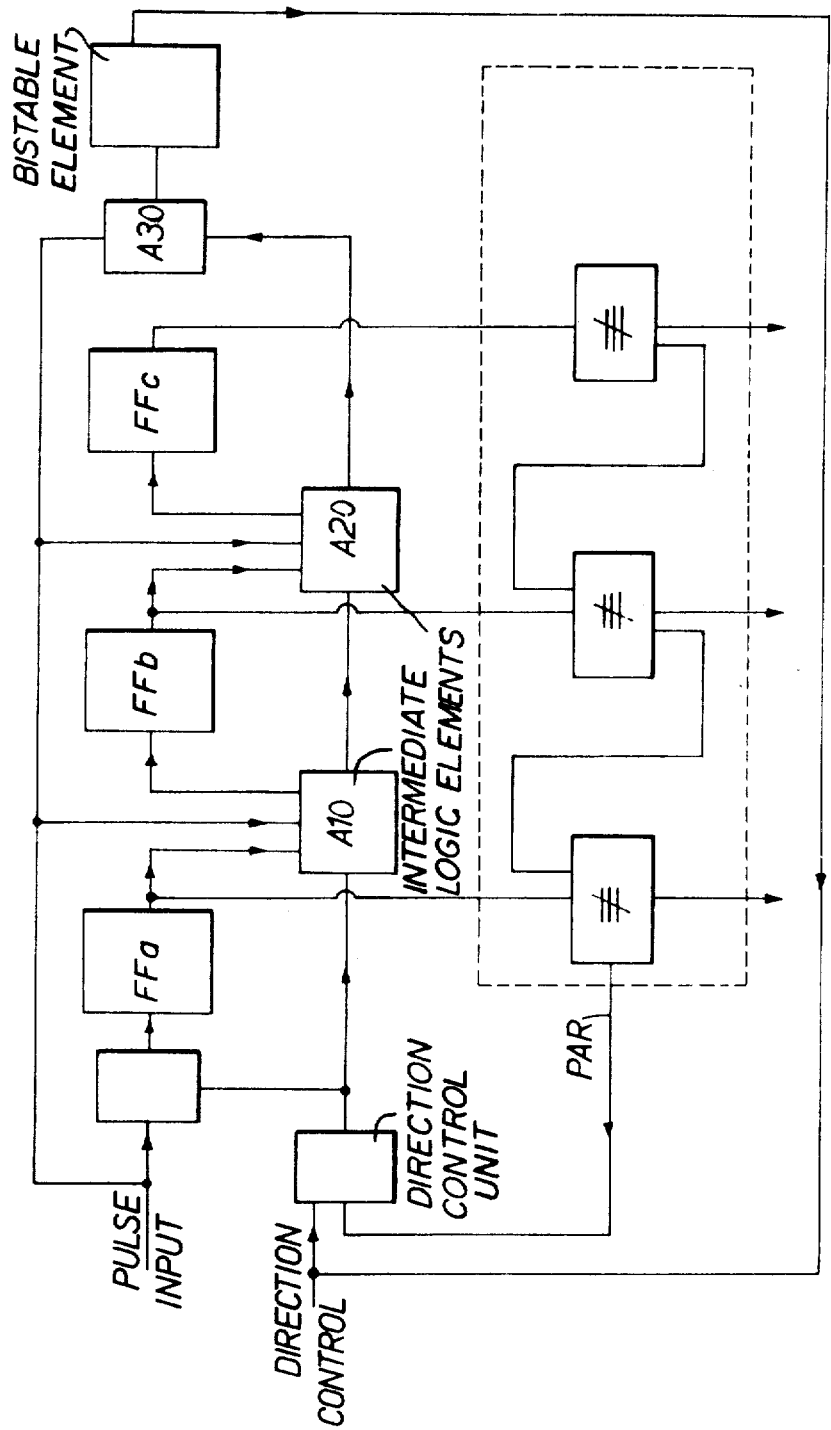
FIG. 11 is a block diagram of a counter permitting overflow.

FIG. 11 shows a schematic wiring diagram of a counter in accordance with this invention and modified so as to permit overflow. In this Figure three bistable elements or flip-flops, $F_a$, $F_b$ and $F_c$, intermediate logic elements represented by A1 and A2 and Gray/binary logic elements $\neq$ similar to those used in FIG. 1 are indicated. To permit overflow, the circuit of FIG. 11 includes an additional intermediate logic circuit A3 and an additional bistable element FX are coupled in circuit as shown. The output of the bistable FX and the parity line signal PAR are fed into a direction control unit DCU.

Figure 12:
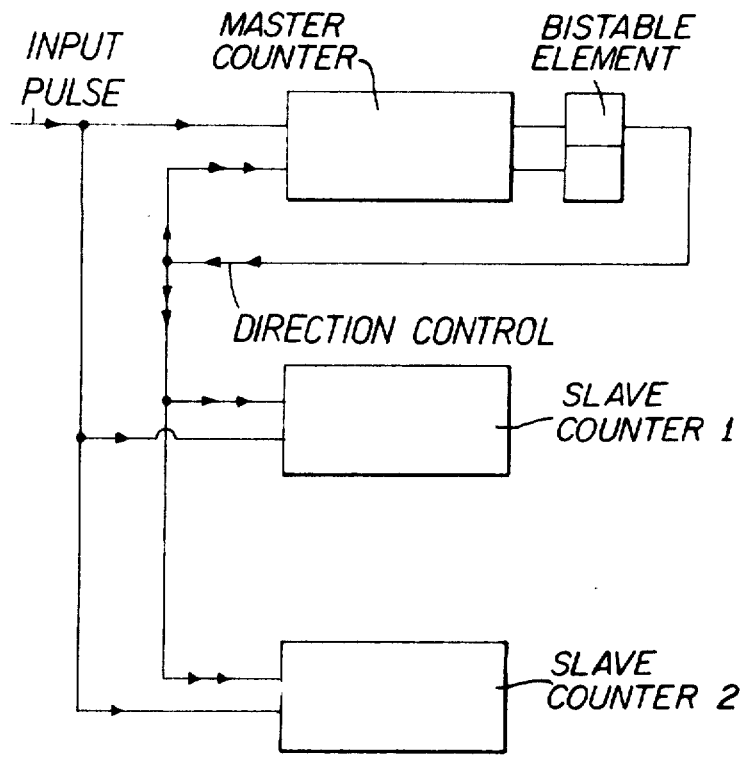
FIG. 12 is a block diagram of a counter capable of synchronization.

FIG. 12 shows a schematic diagram of a master counter MC has generated a second reversal or in other words the direction control signal has changed state.

A system as described in connection with FIG. 12 may be used in serial telemetering and may form the basis of a serialized scanning device for transmitting signals over a single line and extracting the signals as and when required.

What we claim is:

1. A digital computer supervised control system for monitoring and controlling a plurality of separate variables, each variable having an associated and individual measuring device giving an electrical output signal and each measuring device having an associated and individual encoder, the control system comprising:

A. means for supplying data representative of said variables to a computer, said means comprising:

a plurality of continuous feedback encoders each including means for supplying as an input thereto, an electrical signal, representative of a separate one of said variables, each encoder being operable according to the continuous balance feedback prin-ciple to continuously track that associated variable, and each encoder including:

1. means for comparing its respective input with a feedback signal generated by said encoder to develop a comparator output;

2. means for applying said comparator output as a digital input to a counter which comprises a plurality of flip-flop stages and which operates in a cyclic progressive code in a manner such that each unit change in count of the counter is characterized by a single digit transition in said counter; and 3. means for converting the count of said counter to said feedback signal and for applying the feed-back signal to the comparing means, and B. gating means under the control of said computer for selectively applying, as inputs to the computer, at any time, and without synchronization for any duration, the contents of the counter of at least one of the said encoders during the continuous tracking operation thereof, the gating means for each counter including enabling means associated with each flip-flop stage of that counter and the contents of that counter, as distinguished by the states of the flip-flop stages being represented in cyclic progressive code.

2. A system as in claim 1 wherein said signal supplying means includes means for supplying an electrical signal whose frequency varies as a function of the associated variable and wherein said converting means includes means for selecting a given frequency signal in accordance with the count of said counter and applying said given frequency signal to said comparing means.

3. A control system according to claim 1 wherein at least one encoder is associated with a digital controller which is included in a control loop under supervision of the digital computer.

4. A control system according to claim 1 wherein the counter is capable of counting pulses in Gray code up to a maximum of $2^n$ and comprises:
 a. $n$ stages of flip-flops of a type which delays a change in the output state thereof until the initiating input to the flip-flop has terminated;
 b. a single input line for receiving pulses to be counted;
 c. a multiple input enabling means associated with each flip-flop stage, each enabling means having a first one of its inputs connected to said input line;
 d. output lines from said flip-flop stages for carrying as the counter output a Gray coded equivalent of the total number of pulses received on said input line;
 e. $n-1$ logic circuits connected to said flip-flop output lines for generating as a single output from said circuits a parity signal which is a function of the Gray code output of said counter;
 f. an additional logic circuit to which is supplied as inputs the parity signal and a direction control signal, said additional circuit having an output which is applied to a second one of the inputs of the multiple input enabling means associated with the first of said $n$ flip-flop stages to thereby control the change of state of said first flip-flop stage as a function of the input, parity and direction control signals; and
 g. means for connecting second ones of the inputs of the remaining flip-flop stages directly to output lines of the flip-flop stages next preceding and through further logic circuits to output lines of any remaining preceding stages of flip-flops as well as the input, parity and direction control signals.

5. A control system according to claim 4 including a pulse generator for feeding signal pulses to a control unit which serves to feed signal pulses from the control unit to the plurality of flip-flops and to a direction control means.

6. A control system according to claim 4 in which the input signal to the said encoder form a first input signal to the comparator and in which a second input signal fed to the comparator is a feed back signal consisting of the product of the contents of the counter and a reference signal.

7. A system according to claim 6 wherein the measured variable and the reference signal are both analog voltage signals and the system includes a digital/analog converter for producing an analog voltage feed back signal.

8. A system according to claim 6 wherein the measured variable and the reference signal are both frequency signals and the system includes a binary scaler unit for receiving the reference frequency and a frequency selection unit for receiving output from the binary scaler unit and the content of the counter for producing a frequency feed back signal to the comparator.

9. A system according to claim 4 including a binary comparator for comparing the contents of the counter with a discontinuous binary input under the command of an enter/hold control input, the output signal of the binary comparator being transmitted to a control unit which selectively permits signals to be fed to the counter.

* * * * *